Figure 1:
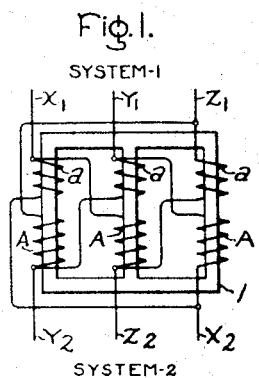

Aug. 11, 1942.  A. N. GARIN  2,292,829
TRANSFORMER
Filed Oct. 15, 1940  4 Sheets-Sheet 1

Inventor:
Alexis N. Garin,
by Harry E. Dunham
His Attorney.

Aug. 11, 1942.  A. N. GARIN  2,292,829
TRANSFORMER
Filed Oct. 15, 1940  4 Sheets-Sheet 2
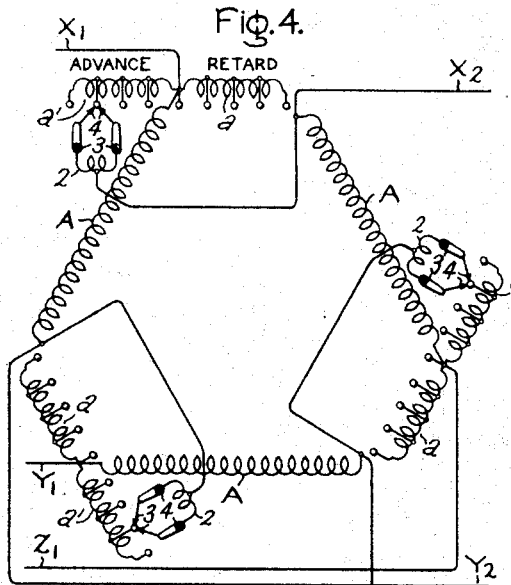
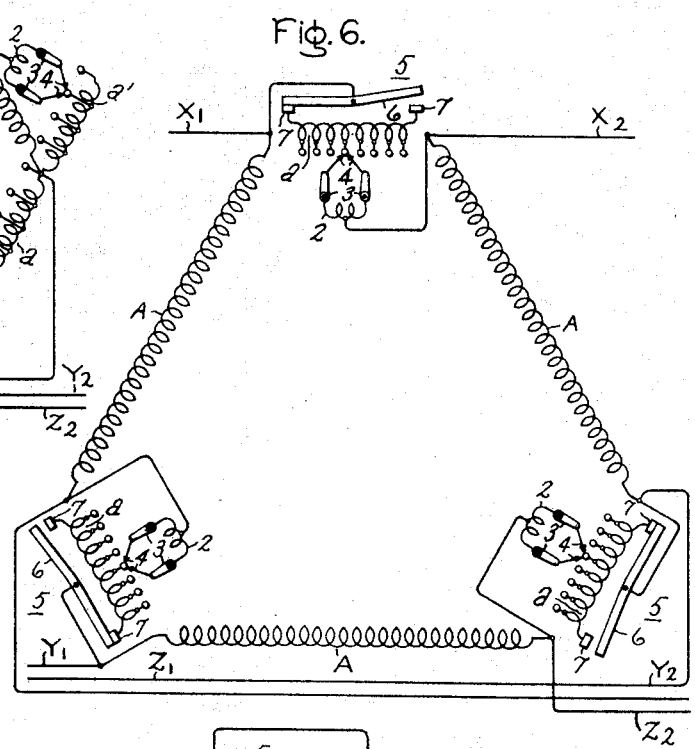
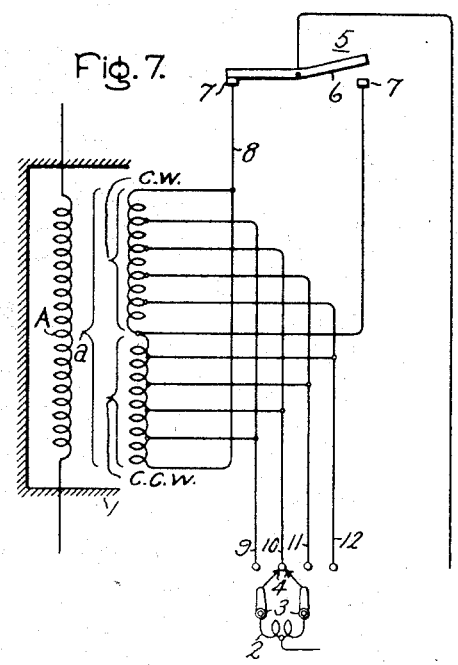
Inventor:
Alexis N. Garin,
by Harry E. Dunham
His Attorney.

Aug. 11, 1942.  A. N. GARIN  2,292,829
TRANSFORMER
Filed Oct. 15, 1940  4 Sheets-Sheet 4

Inventor:
Alexis N. Garin,
by Harry E. Dunham
His Attorney.

Patented Aug. 11, 1942

2,292,829

UNITED STATES PATENT OFFICE 2,292,829

TRANSFORMER

Alexis N. Garin, Pittsfield, Mass., assignor to General Electric Company, a corporation of New York Application October 15, 1940, Serial No. 361,299

11 Claims. (Cl. 172—238)

This invention relates to transformers and more particularly to improvements in phase shifting transformers.

Voltage phase shifting circuits and devices are having a widening field of application both in the control of electrical devices and in the direct control of power flow in electrical power transmission and distribution systems.

In the latter case the phase shifting means is sometimes used as a link between power systems whose voltages are out of phase and in other cases the phase shifting means is inserted in one of two parallel circuits in order to control the distribution of load between the two circuits.

This invention is characterized by a hexagonal relationship between the vector voltages of a mesh connection of six windings. In the preferred embodiment of the invention these six windings constitute a pure autotransformer but separate hexagonal sets may constitute the primary and secondary windings of a conventional transformer. Preferably, although not necessarily, the hexagon is unsymmetrical in the sense that three non-adjacent sides are equal and of one size and the other three sides are equal but of a different size, as contrasted with a symmetrical hexagon in which all six sides are equal. This lack of symmetry causes the mesh connection to have the relatively low zero sequence impedance which is characteristic of a delta winding. Consequently, the transformer acts with respect to third harmonic voltages and single-phase line-to-ground or line-to-neutral faults in the way that a transformer which is provided with a delta winding acts and it is therefore unnecessary to have a delta winding.

The invention is also characterized by a relatively low equivalent transformer kva., that is to say, the kva. of a transformer embodying the invention is substantially less than the kva. of its output circuit.

The invention is further characterized in certain modifications by adjustability of the phase shift voltage while maintaining the input-output voltage ratio of the transformer constant, preferably a one-to-one ratio, and this adjustability of the phase shift voltage is both positive and negative, that is to say, both an advance in phase and a retardation in phase. Also, the plus and minus range is in certain instances symmetrical.

An object of the invention is to provide a new and improved phase shifting transformer.

Another object of the invention is to provide a new and improved three-phase, one-to-one ratio, variable phase shifting autotransformer.

A further object of the invention is to provide a variable phase shifting transformer of simple and economical construction.

The invention will be better understood from the following description taken in connection with the accompanying drawings and its scope will be pointed out in the appended claims.

Figure 2:
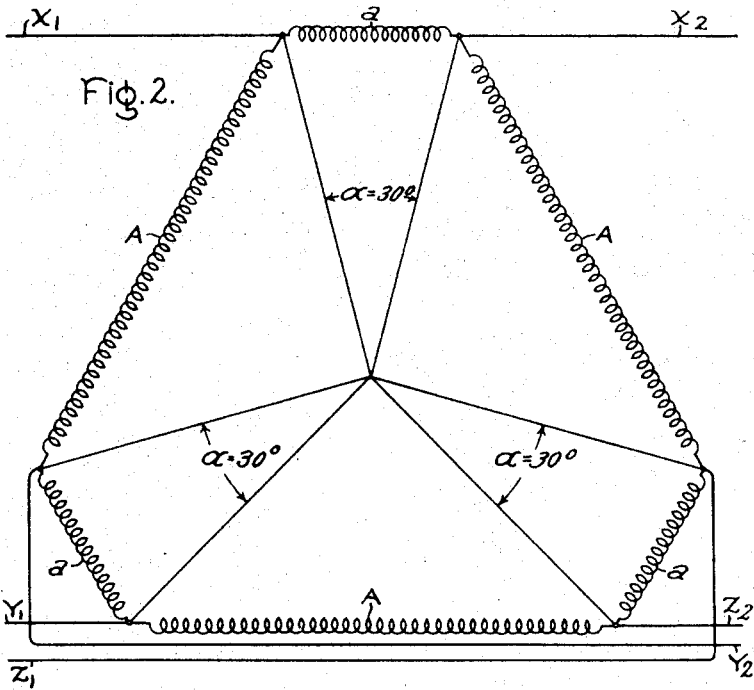
Figure 3:
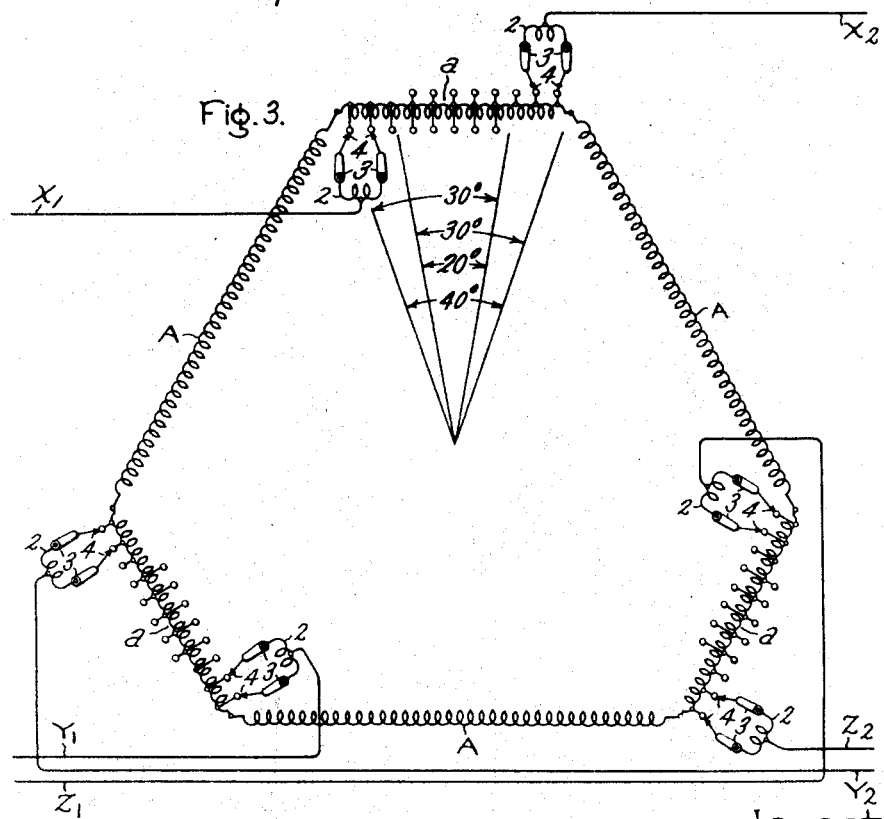
Figure 5:
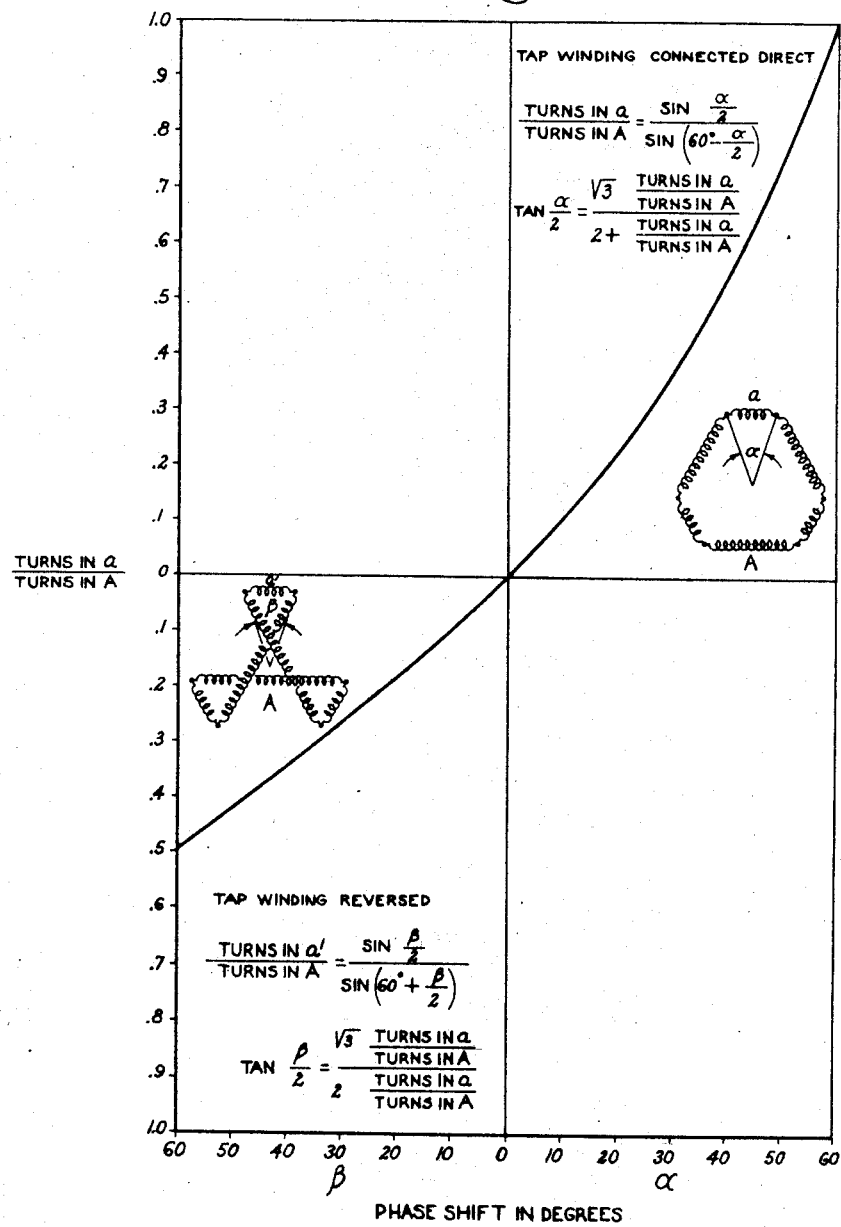
Figure 8:
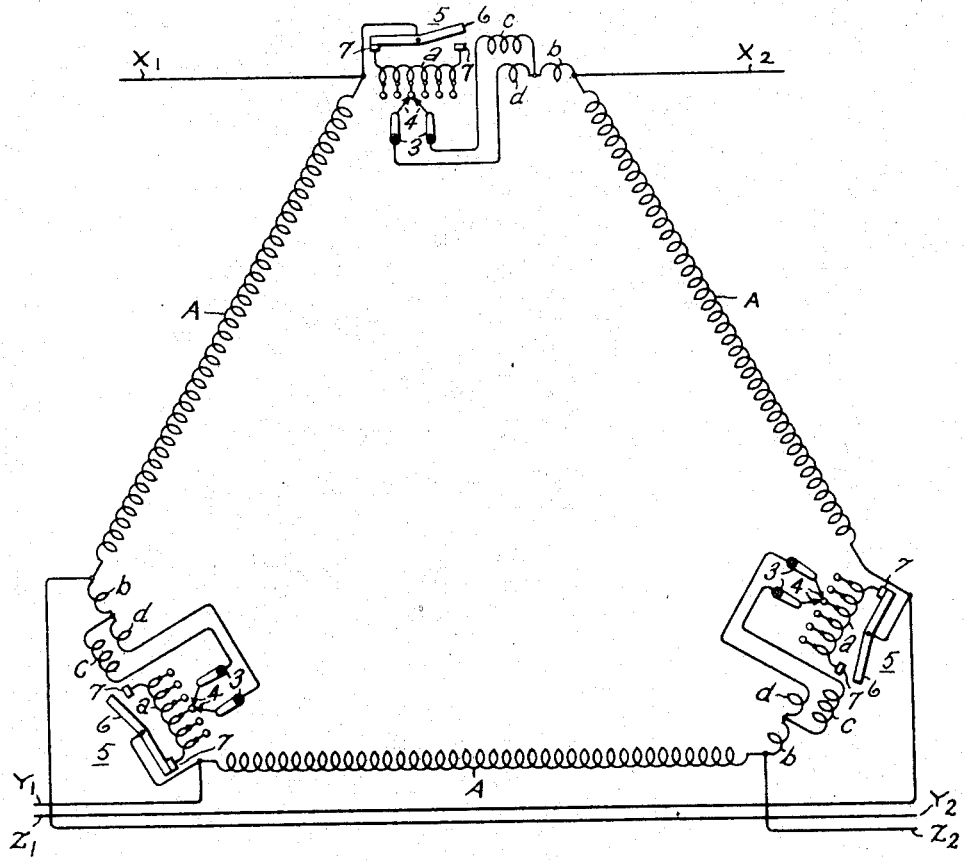
Figure 9:
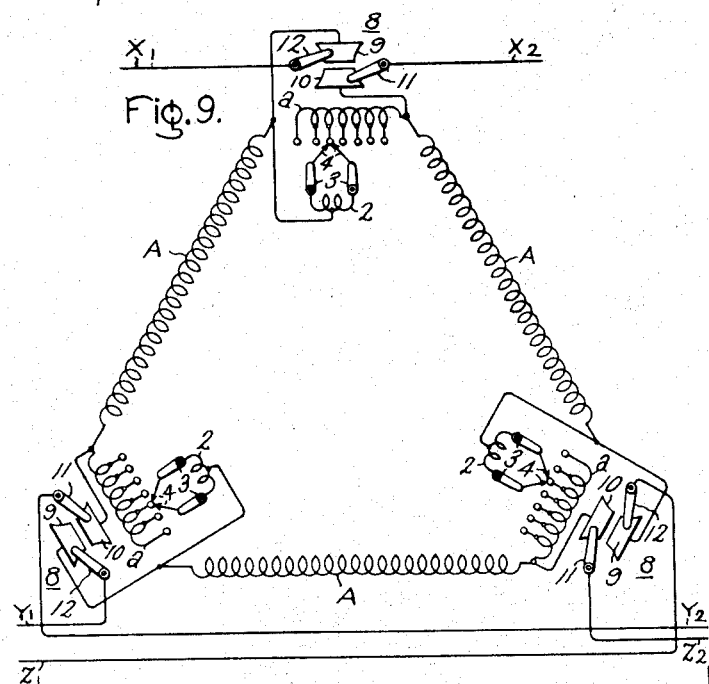

In the drawings, in which similar letters and reference characters designate similar elements throughout the several figures, Fig. 1 illustrates a transformer system embodying the basic features of the invention, Fig. 2 shows the system of Fig. 1 with the transformer windings arranged diagrammatically in unsymmetrical hexagonal relationship and proportioned to produce a thirty-degree phase shift, Fig. 3 is a modification of Fig. 2 for securing variable plus and minus phase shift voltages, Fig. 4 is a modification of Fig. 3 utilizing a double winding arrangement instead of a double tap-changing arrangement, Fig. 5 is a curve showing the comparative operating characteristics of normal and inverted hexagonal connections, Fig. 6 is a further modification utilizing a single series or phase shifting winding and a single tap-changing or ratio adjusting mechanism combined with a reversing switch, Fig. 7 illustrates the physical relationship of the windings in Fig. 6, Fig. 8 is a modification of Fig. 6 which utilizes certain auxiliary windings for securing a symmetrical plus and minus phase shift range, and Fig. 9 is a further modification utilizing a different form of reversing switch for obtaining a symmetrical plus and minus phase shift range.

Referring now to the drawings and more particularly to Fig. 1, the transformer preferably comprises a conventional three-legged magnetic core 1, each leg of which carries a winding A and a winding a. The A windings are similar to each other and the a windings are similar to each other but smaller than the A windings. These windings are serially connected in a closed mesh or loop connection in which the terminals of each of the A windings are connected respectively to terminals of the a windings on the other two legs and in which each of the terminals of the a windings are connected respectively to terminals of the A windings on the other two legs. A three-phase system 1 consisting of a circuit having conductors $X_1$, $Y_1$ and $Z_1$ and a three-phase system 2 consisting of conductors $X_2$, $Y_2$ and $Z_2$ are interconnected by the transformer in such a way that each pair of like lettered conductors is serially connected by means of a different one of the a windings. The A and a windings on each leg are so arranged that their voltages are in phase opposition.

The phase relationship of the voltages of the windings and the connections between the windings are shown more clearly in Fig. 2. In this particular case the phase shift is thirty degrees but it will, of course, be understood that many other phase shift angles may be obtained with different ratios of turns of windings a and A. It can be shown that the ratio of $a$ to $A$ in terms of any angle $\alpha$ is $$\frac{\text{Turns in } a}{\text{Turns in } A} = \frac{\sin \alpha/2}{\sin\left(60° - \frac{\alpha}{2}\right)}$$

It will be seen from Fig. 2 that the line-to-neutral voltages of system 1, that is to say, the voltages between the conductors $X_1$, $Y_1$ and $Z_1$ and the center point of the hexagon are equal to each other and are equal to the line-to-neutral voltages of the system 2.

It will also be seen that this particular arrangement can be used to produce a ninety-degree phase shift between systems 1 and 2 by changing the circuit connections so that the A windings are the series windings instead of the $a$ windings, that is to say, if $Y_2$ is made $X_2$ and $Z_2$ is made $Y_2$ and $X_2$ is made $Z_2$ the phase shift will be ninety degrees.

This transformer accomplishes its one-to-one ratio phase shift in a very economical manner in that the ratio of equivalent transformer kva. to output kva. is less for this transformer than for any other known transformer or circuit that will perform the same function. For a thirty-degree phase shift the equivalent transformer kva. can be shown to be equal to the $$\frac{\sqrt{3}-1}{\sqrt{3}}$$

times the output kva. In an actual numerical example, if the line-to-line voltages of systems 1 and 2 are assumed to be 12,000 volts and the line currents are assumed to be 1443 amperes the data for the $a$ windings will be 3539 volts
1177 amperes
4220 kva.

and for the A windings 9790 volts
432 amperes
4220 kva.

The equivalent transformer kva. is therefore $3 \times 4220 = 12,660$ for an output of $$12,000 \times 1443 \times \frac{3}{\sqrt{3}} = 30,000 \text{ kva.}$$

In Fig. 3 the transformer has been modified so as to provide a variable one-to-one ratio phase shift. The modifications consist of adding taps to the $a$ windings and selectively adjusting the connections of the system conductors to these taps by means of tap-changing equipments. Conventional tap-changing equipments for this purpose consist of a mid-tapped reactor 2, a pair of current interrupting or arcing contactors 3 and a pair of tap selector switches 4. These elements constitute a standard load ratio control equipment. In their illustrated positions the line current divides equally between the two halves of the reactor 2, the two contactors 3 and the two selector switches 4. If it is desired to make a tap change, one of the contactors 3 is opened thereby forcing all of the current to flow through one-half of the reactor. The selector switch 4 in circuit with the opened contactor is then moved to the next adjacent tap and its serially connected contactor 3 is then closed. This forms a so-called bridging or half-cycle position in which the line current again divides substantially equally between the two halves of the tap-changing equipment while a certain amount of circulating current produced by the tap-to-tap voltage flows through all of the tap-changing elements in series. If then the remaining arcing contactor 3 is opened and its associated selector switch is moved in a follow-up manner to the new tap and its arcing contactor is then closed, a complete tap-changing step has been made and the parts will be in the positions shown except that they will be making connection to a different transformer tap.

With the tap changers in the positions shown in Fig. 3 the circuit connections are equivalent to those in Fig. 2 and full phase shift is obtained. If now both of the tap-changing equipments for each of the $a$ windings are moved inwardly one step or to the next inward tap, the connections remain symmetrical but the magnitude of the phase shift voltage between the two interconnected systems is decreased. By successively moving both tap-changing equipments inwardly the phase shift angle would therefore be varied without varying the voltage ratio. When both tap changers are in engagement with the same tap the phase shift voltage is, of course, zero but the tap-changing equipments may continue on past the mid-tap, in which case the phase shift voltage will reverse with respect to the system voltages. In this manner a symmetrical plus and minus phase shift range is produced.

This circuit is quite economical from the standpoint of equivalent transformer kva. in terms of the output rating. The equivalent size for certain phase shift ranges is as follows:

| Phase shift range | Equivalent size |
|---|---|
| | Per cent |
| ±10° | 18 |
| ±20° | 34 |
| ±30° | 47 |

It will be noted, however, that this circuit requires two complete load ratio control equipments per phase. For best operation these equipments should be interlocked by suitable common driving means so that in practice the circuit is relatively expensive.

The circuits thus far described have been said to be inserted between a system 1 and a system 2. This is usually the case with fixed phase shift transformers like the one shown in Figs. 1 and 2 but for variable phase shift transformers like that shown in Fig. 3 the transformer may be considered as being inserted directly in a single three-phase circuit. The variable phase shift under certain conditions can then be made to control the power flow in the circuit in a well known manner.

The windings of Fig. 3 will be arranged on a core in a manner similar to Fig. 1 although in practice the tapped $a$ windings will be wound over the A windings so that all of the taps will be on the outside winding.

In Fig. 4 a variable plus and minus phase shift is obtained with half as much load ratio control equipment as is used in Fig. 3. This is done by adding auxiliary windings $a$ as extensions of winding $a$ and by completing the hexagon connection through the tap changing equipment.

With the tap-changing equipments making connection with taps on the $a'$ windings the circuit operates as an inverted hexagon.

This circuit does not have the inherent symmetry of the circuit shown in Fig. 3.

This is shown more clearly by Fig. 5, which illustrates the relation between the ratio of turns in windings $a$ when connected direct and when reversed ($a'$) to turns in windings A which correspond with different phase shift angles. As will be seen from the curve, equal angular changes require different turn ratios for the tap winding $a$ connected direct, that is, the normal hexagon connection and for the tap winding reversed ($a'$) so as to give the inverted hexagon connection.

Therefore, if symmetrical operation is desired the tap spacings on the winding $a$ and $a'$ in Fig. 4 will have to be different and will have to be made in accordance with the data provided by Fig. 5.

The equivalent transformer kva. required in terms of output rating for the circuit of Fig. 4 is as follows:

| Phase shift range | Equivalent size |
|---|---|
| | Per cent |
| ±10° | 28 |
| ±20° | 58 |
| ±30° | 90 |

In Fig. 6 a reversing switch 5 has been substituted for the auxiliary winding $a'$. This reversing switch is of the single-pole double-throw type comprising a movable contact 6 and a pair of fixed contacts 7 which are selectively engaged by the movable contact. As shown, the movable contact is permanently connected to one terminal of winding A while the fixed contacts 7 are connected to the terminals of the winding $a$. With the reversing switch in the position shown, the operation of the load ratio control equipment will give variable phase shift angles $\alpha$ as in Fig. 5 because the connection is then a normal hexagonal connection while with the reversing switch 5 moved to its other position the connection becomes an inverted hexagon and operation of the tap-changing equipment gives variable phase shift angles $\beta$ as shown in Fig. 5. Fig. 6 therefore also has an inherently unsymmetrical phase shift range. It, however, has the advantage over Fig. 4 that a reversing switch is much simpler than an extra tap winding with all its attending design difficulties and that the contactor duty is very much less in Fig. 6 than in Fig 4, it being reduced in the latter figure down to the level of circuits having two separate load ratio control equipments per phase as in Fig. 3. Furthermore, its equivalent transformer kva. in terms of output rating is less than that of Fig. 4, it being

| Phase shift range | Equivalent size |
|---|---|
| | Per cent |
| From +10° to −11° | 21 |
| From +20° to −25° | 50 |
| From +30° to −42½° | 85 |

The preferred way of arranging the windings for the circuit of Fig. 6 is shown in Fig. 7 for one pair of windings A and $a$. As shown, winding A is wound inside the winding $a$. The latter is really two windings, the upper half being wound in one direction indicated, for example, as clockwise and the lower half being wound in the opposite direction. The midpoint is connected to one of the contacts 7 and the extremities are connected together and are connected to the other contact 7 by means of a conductor 8. Symmetrically located pairs of taps on the $a$ windings are then interconnected and brought out by leads 9, 10, 11, 12, etc. to the fixed contacts of the load ratio control switching means. In this manner the coupling between the windings remains symmetrical with the load ratio control equipment in engagement with any of the taps.

In Fig. 8 the circuit of Fig. 7 has been modified by adding windings $b$, $c$ and $d$. The windings $c$ and $d$ take the place of the mid-tapped reactor 2 and the three windings $b$, $c$ and $d$ together are so proportioned as to give a symmetrical plus and minus voltage range. These three windings are wound on the same leg with their associated winding $a$. The voltage of windings $c$ and $d$ is so related to the tap-to-tap voltage of winding $a$ that smooth phase shift voltage variation is obtained as the selector switches are moved from tap to tap.

The windings $b$, $c$ and $d$ taken together introduce a definite phase shift voltage in the same direction regardless of the position of the reversing switch. For example, if it is desired to obtain a symmetrical plus or minus 25% range, the turns in $a$ will be made equal to 26% of the turns in winding A and the effective turns of windings $b$, $c$ and $d$ will be made equal to 3% of the turns in the winding A. Therefore, with the reversing switch connected to give a normal hexagon relationship the turns in series with the conductors of the three-phase system will be $a+b+c+d=26\%+3\%=29\%$ which is the required ratio as shown in Fig. 5. If now the reversing switch is moved to its other position so as to produce the inverted hexagon the serially connected turns in the power system conductors will be $26\%-3\%$ or $23\%$ of the turns in the winding A. It will be seen from Fig. 5 that this is the correct ratio to give $\beta=25\%$.

In Fig. 9 the circuit of Fig. 6 has been changed in such a manner that the reversing switch is a double-pole double-throw type. This reversing switch, shown at 8, may consist for example of a pair of fixed contacts 9 and 10 connected respectively to the terminals of the windings A between which a winding $a$ is inserted, and a pair of movable contacts 11 and 12 connected respectively to the conductors of the corresponding phases of the three-phase systems 1 and 2. This circuit gives a symmetrical plus and minus phase shift because the connections of the power systems to the transformer are reversed instead of reversing the relative connections of the windings A and $a$ of the transformer. The phase shift range corresponds to the direct hexagonal connection range, that is to say, the range of angles $\alpha$ in Fig. 5 for both plus and minus phase shifts.

It has a relatively very low equivalent size, the size for various phase shift ranges being

| Phase shift range | Equivalent size |
|---|---|
| | Per cent |
| ±10° | 17 |
| ±20° | 34 |
| ±30° | 49 |

The arrangement of the windings is preferably the same as in Fig. 7 except that the extra tap required for the standard single-pole type reversing switch is not needed.

In operation the tap changer is moved from one end of winding $a$ to the other with the switch 8 in the illustrated position to give the plus phase-shift range and then the movable contact 11 is transferred from fixed contact 10 to fixed contact 9, the movable contact 12 is transferred from fixed contact 9 to fixed contact 10 thereby reversing the power circuit connections and reversing the phase shift. If then the tap changer is moved from one end of the winding $a$ to the other the minus phase shift range will be traversed.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. A three-phase one-to-one ratio phase shifting autotransformer comprising, in combination, a three-legged core, three equal windings of a given number of turns located respectively on said legs, and three equal windings of a greater number of turns located respectively on said legs, said six windings being serially connected to form a mesh connection in which each winding of a given number of turns is electrically connected between the two windings of a greater number of turns which are on the other two legs, said windings of a given number of turns being respectively serially connected in the phase conductors of a three-phase circuit whereby the phase of the voltage of said circuit is shifted through a predetermined angle without changing the magnitude of said voltage.

2. A three-phase one-to-one ratio phase shifting autotransformer system comprising, in combination, six windings divided into two three-phase groups, said windings being serially connected in a six phase mesh, and a three-phase circuit, the windings of one of said three-phase groups being serially connected respectively in the conductors of said circuit.

3. In combination, a three-phase one-to-one ratio phase shifting transformer having two windings per phase connected to form a six phase hexagonal mesh connection, a three-phase circuit, means for connecting one set of alternate windings of said mesh connection respectively in series with the conductors of said circuit, and means for varying the number of turns of said last mentioned windings which are serially connected in said circuit.

4. In combination, a three-phase one-to-one ratio phase shifting transformer having two windings per phase connected to form a six phase hexagonal mesh connection, a three-phase circuit, means for connecting one set of alternate windings of said mesh connection respectively in series with the conductors of said circuit, means for varying the number of turns of said last mentioned windings which are serially connected in said circuit, and means for reversing the connection of said turns in the conductors of said circuit.

5. In combination, a three-legged magnetic core, an inner winding of the same number of turns on each of the legs of said core, an outer winding of the same number of turns on each of said legs, the number of turns of said inner and outer windings being different, said outer windings each having an upper half wound in one direction and a lower half wound in the opposite direction, said halves being permanently connected in parallel, a plurality of equal voltage points on said parallel connected halves being permanently interconnected and taps brought out of the windings therefrom, all six of said windings being serially connected in a closed mesh for six-phase hexagonal voltage, a three-phase circuit connected to include a different one of said outer windings in each of its phase conductors respectively, and tap-changing means cooperating with the taps brought out of said outer windings for varying the number of current carrying turns of said outer windings.

6. In combination, a three-legged magnetic core, a tapped and an untapped winding on each leg of said core, three switches each provided with a movable contact for selectively engaging one or the other of two fixed contacts, the fixed contacts of each switch being permanently connected respectively to the terminals of said tapped windings, the movable contact of each switch being permanently connected respectively to a terminal of an untapped winding on another leg from the one carrying the tapped winding across which said switch's fixed contacts are connected, three tap-changing equipments for cooperation respectively with the taps of said tapped windings, said equipments being connected respectively to the remaining terminals of said untapped windings, a first three-phase circuit having its phase conductors connected respectively to the movable contacts of said switches, and a second three-phase circuit having its phase conductors connected respectively to said tap-changing equipments, said windings being so wound that the vector diagram of their voltages constitute a six-phase hexagon.

7. The combination of six transformer windings in a closed series connection for six-phase hexagonal voltage, means for varying the turns in said series connection of three of said windings which are electrically non-adjacent to each other, a three-phase circuit, the variable turns in said series connection of said three windings also being serially connected respectively in the conductors of said circuit, and means for selectively reversing the connection of said turns in said conductors without changing the relation of said turns to said closed series connection of said six windings.

8. A three-phase one-to-one ratio variable phase shifting autotransformer system comprising, in combination, a three-legged core, each of said legs being provided with a tapped winding of the same number of turns and an untapped winding of a substantially greater number of turns, a permanent connection between a terminal of each untapped winding and a terminal of a tapped winding on another leg, an adjustable connection between the remaining terminal of each untapped winding and the taps of the tapped winding on the remaining leg. a three-phase circuit, and polarity reversing switching means for serially connecting the active portions of said tapped windings respectively in the conductors of said circuit.

9. In combination, six transformer windings serially connected in a closed mesh for six-phase hexagonal voltage, three double-pole double-throw polarity reversing switches each having two input terminals and two output terminals, a three-phase circuit having its conductors connected respectively to three of said input terminals, a second three-phase circuit having its conductors connected respectively to the remaining input terminals, the two output terminals of each switch being connected respectively across electrically non-adjacent ones of said six windings.

10. In combination, a three-phase one-to-one ratio phase shifting autotransformer having two windings per phase connected to form a six phase hexagonal mesh connection, a three-phase circuit, means for connecting one set of alternate windings of said mesh connection respectively in series with the conductors of said circuit, and means for varying the number of turns of one set of alternate windings with respect to the turns of the remaining set of alternate windings.

11. In combination, a polyphase mesh-connected autotransformer winding, said winding having a first set of electrically symmetrically located terminals for connection to a polyphase input circuit, said winding having a second set of electrically symmetrically located terminals for connection to a polyphase output circuit, and means for adjusting the effective number of turns of said winding between each pair of said terminals.

ALEXIS N. GARIN.